United States Patent [19]

Glogovsky

[11] Patent Number: 4,804,029
[45] Date of Patent: Feb. 14, 1989

[54] TIRE BEAD SEATER

[75] Inventor: Richard Glogovsky, Libertyville, Ill.

[73] Assignee: Ammco Tools, Inc., North Chicago, Ill.

[21] Appl. No.: 95,945

[22] Filed: Sep. 14, 1987

[51] Int. Cl.⁴ .............................................. B60C 25/07
[52] U.S. Cl. ....................................... 157/1.1; 157/17; 157/1.24
[58] Field of Search ...................... 157/1.0, 1.1, 16, 20, 157/21, 1.17, 1.22, 1.24; 51/439

[56] References Cited

U.S. PATENT DOCUMENTS

| | | | |
|---|---|---|---|
| 3,522,469 | 1/1971 | Corless | 157/1.1 |
| 3,528,475 | 9/1970 | Duquesne | 157/1.24 |
| 3,628,627 | 12/1971 | Arnold | 51/439 X |
| 3,675,705 | 7/1972 | Corless | 157/1.1 |
| 3,786,852 | 1/1974 | Houston | 157/1.1 |
| 3,814,163 | 6/1974 | Charles et al. | 157/1.1 |
| 3,866,654 | 2/1975 | Duquesne | 157/1.1 |
| 4,245,686 | 1/1981 | Holladay | 157/1.1 |

Primary Examiner—Debra Meislin
Attorney, Agent, or Firm—Edmond T. Patnaude

[57] ABSTRACT

A bead seating system which comprises a wheel and tire support having a small diameter central hub, a plurality of widely spaced radial clamp carrying support arms, a single, elongated air nozzle located below and in proximity to the support and a noise reduction housing enclosing the nozzle. The orifice of the nozzle is elongate in the horizontal direction and directs a flat, trapezoidal stream of air through an opening in the noise reduction housing and the space between two of the radial support arms into the area between the bead of the tire and the rim of a wheel resting on the support. The nozzle is angularly oriented relative to the horizontal so that for all rim sizes the air stream is directed either into the space between the rim and the bead or in a direction nearly tangential to the outer wall of the tire. Accordingly, the air flows along the side wall of the tire in a laminar manner into the tire.

7 Claims, 2 Drawing Sheets

TIRE BEAD SEATER

The present invention relates in general to the art of inflating tubeless tires after they are mounted on a wheel, and it relates more particularly to apparatus which injects air between the wheel rim and the tire bead in order to seal the bead to the rim to permit full inflation of the tire with air supplied thereto through the usual tire valve.

BACKGROUND OF THE INVENTION

Bead seating apparatus which injects air into a tubeless tire between the tire bead and the rim of the associated wheel is well known. See, for example, U.S. Pat. Nos. 3,522,469; 3,675,705; and 3,814,163 which describe such bead seaters. In this type of bead seater at the same time that air is supplied to the tire through the usual inflation valve high velocity air is injected into the tire between the bead and the rim. Air is thus supplied to the tire at a rate which is faster than the rate at which air can escape from the tire, wherefore the tire becomes pressurized and the bead is forced into sealing engagement with the rim. Thereafter, the high velocity air stream is terminated and the air supplied through the usual tire valve fully inflates the tire.

While these prior art bead seaters have performed satisfactorily, they have been relatively large and cumbersome and are relatively noisy. Moreover, any given machine has not functioned well with all sizes of tires and with all tire and wheel combinations. Indeed, it is extremely difficult and in some cases impossible to seat the beads of some tire and wheel combinations with the bead seaters now on the market.

Some of the aforementioned prior art bead seaters have employed rings of orifices surrounding the bead from which high velocity air is injected into the tire along the entire periphery of the bead to be seated. Attempts to reduce the noise from machines of this type have not been successful. In other bead seaters air has been injected between the tire bead and the rim from a plurality of orifices arranged in an arc. Noise is still a problem.

In some of these prior art bead seaters the air is injected down into the tire from orifices disposed above the tire while in others the air is injected up from the bottom as, for example, in the bead seating apparatus shown in U.S. Pat. No. 3,786,852.

When the air is injected from the bottom it tends to follow the surface of the table on which the wheel rests and thus to be deflected by the edge of the wheel rim which creates turbulence in the area between the rim and the bead and thereby impedes the smooth flow of air into the tire and generates additional high frequency noise. On the other hand, locating the bead seating manifold and orifices above the tire has made it more difficult to place the wheels and tires on the associated tire changer as well as to remove the inflated wheels and tires from the tire changer, and has made the noise problem more difficult to correct.

SUMMARY OF THE INVENTION

Briefly, there is provided in accordance with the present invention a new and improved bead seating system which comprises a wheel and tire support having a small diameter central hub, a plurality of widely spaced radial clamp carrying support arms, a single, elongated air nozzle located below and in proximity to the support and a noise reduction housing enclosing the nozzle. The orifice of the nozzle is elongate in the horizontal direction and directs a flat, trapezoidal stream of air through an opening in the noise reduction housing and the space between two of the radial support arms into the area between the bead of the tire and the rim of a wheel resting on the support. The nozzle is angularly oriented relative to the horizontal so that for all rim sizes the air stream is directed either into the space between the rim and the bead or in a few cases in a direction nearly tangential to the outer wall of the tire wherefor the air flows along the side wall of the tire in a laminar manner into the tire.

GENERAL DESCRIPTION OF THE DRAWINGS

The present invention will be better understood by a reading of the following detailed description taken in connection with the accompanying drawings wherein.

DETAILED DESCRIPTION

Figure 1:
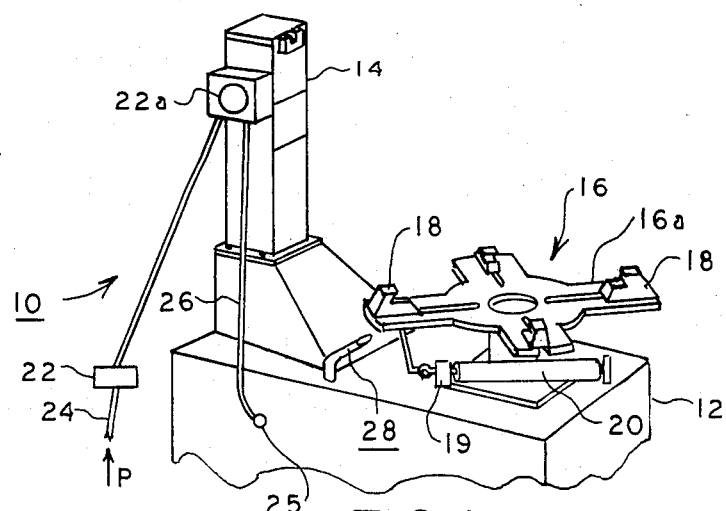
FIG. 1 is a partial perspective view of a tire changer machine which incorporates a bead seating system embodying the present invention.
Figure 2:
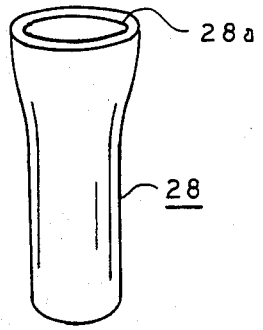
FIG. 2 is an end view of the bead sealing air injection nozzle employed in the machine of FIG. 1.
Figure 3:
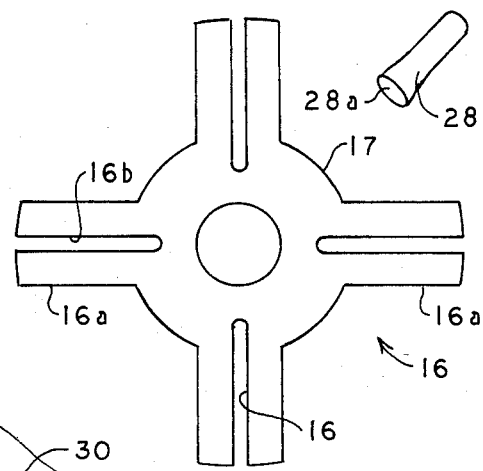
FIG. 3 is a plan view of the tire and wheel support table and the bead seater nozzle.

Referring now to FIG. 1 there is shown generally at 10 the bead seating system in accordance with the principles of the present invention. System 10 includes a base 12 having an upright support member 14 and a turntable support 16. Turntable 16 is adapted to engage and support a vehicle wheel and includes a plurality of support arms 16a. Each support arm includes a open ended slotted portion 16b as best illustrated in FIG. 3. Support arms 16a respectively receive chuck jaws 18 therein as illustrated in FIG. 1. Each chuck jaw is adapted for radial movement toward and away from a central hub portion 17 of turntable 16. The chuck jaws 18 are interconnected by linkages and a control plate (not shown) so as to provide simultaneous movement along slots 16a in response to the movement of a shaft 19 connected to a slidable piston disposed in a jaw actuating cylinder 20. System 10 further includes a source of compressed air which is represented by the symbol P in FIG. 1. The air pressure communicates with a pedal-actuated control valve 22 (symbolically represented as a box in FIG. 1) and pressure indicator 22a by way of an input hose 24. Valve 22 is opened or actuated by means of the foot pedal. The output of valve 22 is connected to a valve stem adapter 25 by way of an output hose 26. System 10 further includes a tubular nozzle 28 which communicates with a source of compressed air (not shown). In currently preferred practice, the source of compressed air coupled to nozzle 28 is actuated by a foot-operated pedal device (not shown). Similarly, chuck jaw actuating cylinder 20 preferably is controlled by a pedal device.

Referring now to FIG. 12 there is shown an end view of the bead sealing air injection nozzle 28 and which illustrates the horizontally extending generally elliptically elongated orifice 28a thereof. Nozzle 28 and orifice 28a are arranged and oriented to direct a stream of air at an angle on the order of 47° relative to the plane of a wheel mounted on turntable 16. Nozzle 28 is also arranged relative to turntable 16 to direct the stream of air through the space between two of the radial support arms and into the area of between the bead of the tire and the rim of a wheel supportively resting on turntable 16.

Figure 5:
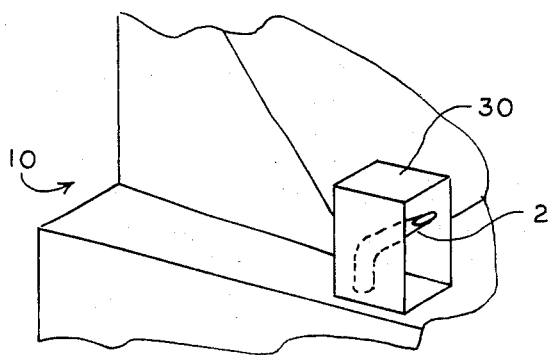

Referring now to FIG. 5 there is shown a partial perspective view of system 10 of FIG. 1 and further illustrating a nozzle shroud device. Shroud device 30 preferably comprises a generally cubical member having an opening along one side thereof to permit bursts of air emitted from orifice 28a to impinge upon the tire of the vehicle wheel during the installation process. Shroud device 30 functions to provide protection of nozzle 28 during the placememt on and removal of a tire. Moreover, the function of shroud device 30 is to significantly reduce inflation noise during the tire inflation process. In this regard, it has been found that shroud device 30 reduced the inflation noise to a level within governmental requirements for the air burst periods of operation required for a bead seating operation.

Figure 4A:
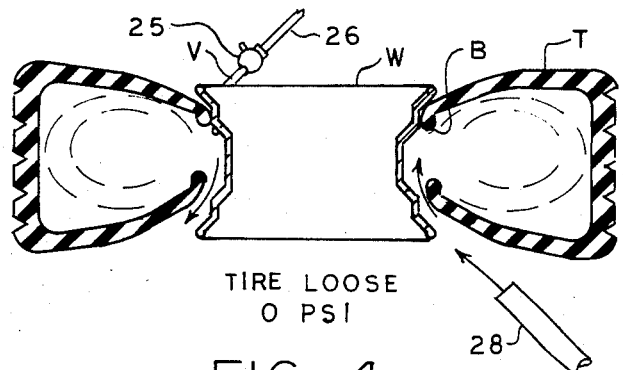
FIGS. 4a, 4b and 4c are cross-sectioned elevational views of a tire and wheel during three stages of inflation; and, FIG. 5 is a partial perspective view of the machine of FIG. 1 illustrating a noise-reducing shroud device which is used in conjunction with the nozzle of FIGS. 1 and 2.
Figure 4B:
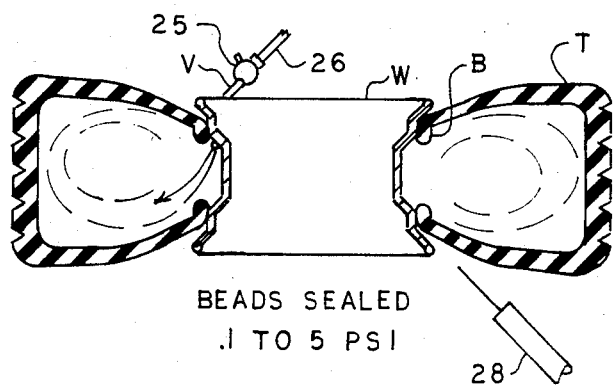
Figure 4C:
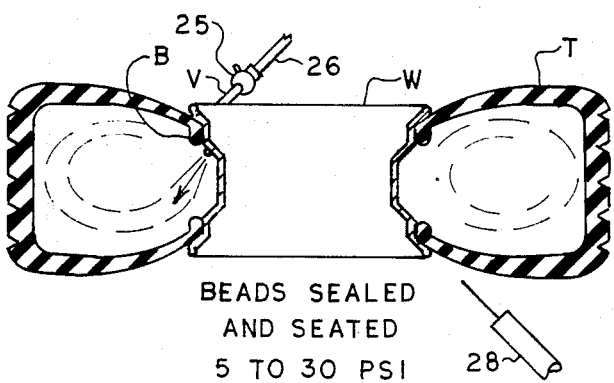

The operation of system 10 will now be described in conjunction with FIGS. 4a, 4b and 4c. The vehicle wheel W with the attached but unseated tire T is located upon turntable 16. Thereafter the operator removes valve stem adaptor 25 from its mounting on upright 14. Valve stem adapter 25 is then connected to and clamped onto valve stem V of wheel W and tire T. Valve 22 is then actuated by depressing the foot pedal whereby the pedal-actuated source of compressed air for nozzle 28 is actuated to provide a burst of air directed toward the underside of tire T as illustrated in FIG. 4a. Valve stem adapter 25 can be actuated by the same foot pedal which activates nozzle 28 or a separate actuating device can be provided. As illustrated in FIG. 4b, once the pressure developed within the cavity of tire T increases into the range between 0.1 to 5 psi, the beads B of tire T begin to seal. Thereafter, as the pressure is increased within the range of 5 to 30 psi the beads become fully seated within wheel W.

What has been taught, then, is a tire bead seating apparatus facilitating, notably, a significant reduction of tire installation inflation noise and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. Apparatus for inflating a tubeless tire mounted on a vehicle wheel, said tire having an inflation/deflation valve mounted thereto, comprising in combination
   a base,
   a vehicle wheel support structure carried
      by said base and movably mounted relative to said base,
   said support structure having a central hub portion and a plurality of support arms extending radially from said hub,
   wheel engageable clamping means for fixedly mounting a vehicle wheel to said support structure,
   said clamping means including a plurality of clamps respectively mounted for adjustable radial movement along said support arms,
   a tubular nozzle fixedly mounted to said base and disposed
      below said support structure such that said support structure is
   movably mounted relative to said nozzle,
   means for controlling the supply of air under pressure to said nozzle,
   said nozzle having at its upper end a single orifice positioned to direct air in a generally upward direction through the space between adjacent ones of said arms positioned on opposite sides of said orifice, and
   said orifice being elongated in its horizontal direction.

2. Apparatus according to claim 1 wherein said means for controlling comprises a valve and wherein said valve and said single orifice constitute the only means included in said apparatus for inflating said tire.

3. Apparatus according to claim 2 wherein said nozzle and said orifice are oriented to direct said stream of air at an angle of about 47°±1° relative to the plane of a wheel mounted on said support structure.

4. Apparatus according to claim 1 wherein
   the dimension of said orifice in said elongated direction is at least twice the dimension of said orifice in the direction perpendicular to said elongated direction.

5. Apparatus according to claim 1 comprising
   a sound muffling housing mounted to said base, and
   said nozzle being disposed entirely within said housing.

6. Apparatus according to claim 5 wherein
   said base comprises an upper wall, and
   said nozzle is a rigid tube extending through said wall into said housing.

7. Apparatus for inflating a tubeless tire mounted on a vehicle wheel, said tire having an inflation/deflation valve mounted thereto, comprising in combination
   a base,
   a vehicle wheel support structure carried by said base,
   said support structure having a central hub portion and a plurality of support arms extending radially from said hub,
   wheel engageable clamping means for fixedly mounting a vehicle wheel to said support structure,
   said clamping means including a plurality of clamps respectively mounted for adjustable radial movement along said support arms,
   a tubular nozzle mounted to said base and disposed below said support structure,
   means for controlling the supply of air under pressure to said nozzle,
   said nozzle having at its upper end a single orifice positioned to direct air in a generally upward direction through the space between adjacent ones of said arms positioned on opposite sides of said orifice, and
   said orifice being elongated in its horizontal direction,
   a sound muffling housing mounted to said base, and
   said nozzle being disposed entirely within said housing, wherein
   said base comprises an upper wall, and
   said nozzle is a rigid tube extending through said wall into said housing, and
   means for rotating said support structure about the central vertical axis of said hub, and
   said nozzle being located out of the path of movement of said support structure,
   whereby said nozzle does not interfere with the mounting of a wheel and tire on said support structure and does not interfere with the rotation of said support structure.

* * * * *